(12) United States Patent
Biziorek et al.

(10) Patent No.: US 8,807,023 B2
(45) Date of Patent: Aug. 19, 2014

(54) ROUND BALER WITH ELECTRICALLY DRIVEN ROLLER

(75) Inventors: Stéphane Biziorek, Champlitte (FR); Didier Delphigué, Dijon (FR)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 13/024,480

(22) Filed: Feb. 10, 2011

(65) Prior Publication Data
US 2012/0192731 A1     Aug. 2, 2012

(30) Foreign Application Priority Data
Apr. 29, 2010   (EP) ...................................... 10161386

(51) Int. Cl.
| B30B 3/00 | (2006.01) |
| A01F 15/18 | (2006.01) |
| A01F 15/08 | (2006.01) |

(52) U.S. Cl.
CPC ............... A01F 15/085 (2013.01); A01F 15/18 (2013.01); A01F 2015/186 (2013.01)
USPC .................... 100/87; 100/88; 100/89; 56/341

(58) Field of Classification Search
CPC .............................. A01F 15/07; B30B 11/222
USPC .................................... 56/341; 100/87, 88, 89
See application file for complete search history.

(56) References Cited

U.S. PATENT DOCUMENTS

| 4,918,910 A * | 4/1990 | Sheehan et al. .................. 56/341 |
| 5,215,184 A * | 6/1993 | Huber ............................ 198/782 |
| 6,041,766 A * | 3/2000 | Vojtechovsky ............ 125/16.02 |
| 6,135,269 A * | 10/2000 | Huber et al. ................... 198/718 |
| 6,973,779 B2 * | 12/2005 | Naaktgeboren et al. ......... 60/328 |
| 7,337,713 B1 * | 3/2008 | Olander et al. ..................... 100/4 |
| 2002/0056262 A1 | 5/2002 | Favache |
| 2003/0006075 A1 * | 1/2003 | Arnold .......................... 180/53.6 |
| 2004/0148917 A1 * | 8/2004 | Eastwood ........................... 56/6 |
| 2005/0247215 A1 * | 11/2005 | Biziorek et al. ................. 100/87 |
| 2008/0148703 A1 * | 6/2008 | Smith et al. ..................... 56/341 |
| 2009/0120766 A1 * | 5/2009 | Markle et al. ............ 198/781.05 |
| 2010/0077716 A1 * | 4/2010 | Sonne ............................. 56/341 |

FOREIGN PATENT DOCUMENTS

| DE | 2141706 A1 | 2/1973 |
| DE | 28 01 309 | 7/1979 |
| DE | 41 32 664 | 4/1997 |
| DE | 19609926 A1 | 9/1997 |
| DE | 196 21 391 | 12/1997 |
| DE | 196 28 604 | 1/1998 |
| DE | 102006000815 A1 | 7/2007 |
| DE | 10 2007 015 649 | 10/2008 |
| DE | 102008014998 A1 | 9/2009 |
| EP | 1 174 019 | 1/2002 |
| EP | 1 273 217 | 1/2003 |
| WO | 94/24845 | 11/1994 |
| WO | 2005011456 A2 | 2/2005 |

OTHER PUBLICATIONS

EP Notice of Opposition, dated Aug. 23, 2013 (28 pages).

* cited by examiner

*Primary Examiner* — Shelley Self
*Assistant Examiner* — Onekki Jolly
(74) *Attorney, Agent, or Firm* — Quarles & Brady LLP

(57) ABSTRACT

A round baler is provided. The round baler having a frame and a baling chamber radially surrounded by bale forming means with one or more driven rollers. An electric motor for driving the roller is disposed in the interior of the roller.

19 Claims, 4 Drawing Sheets

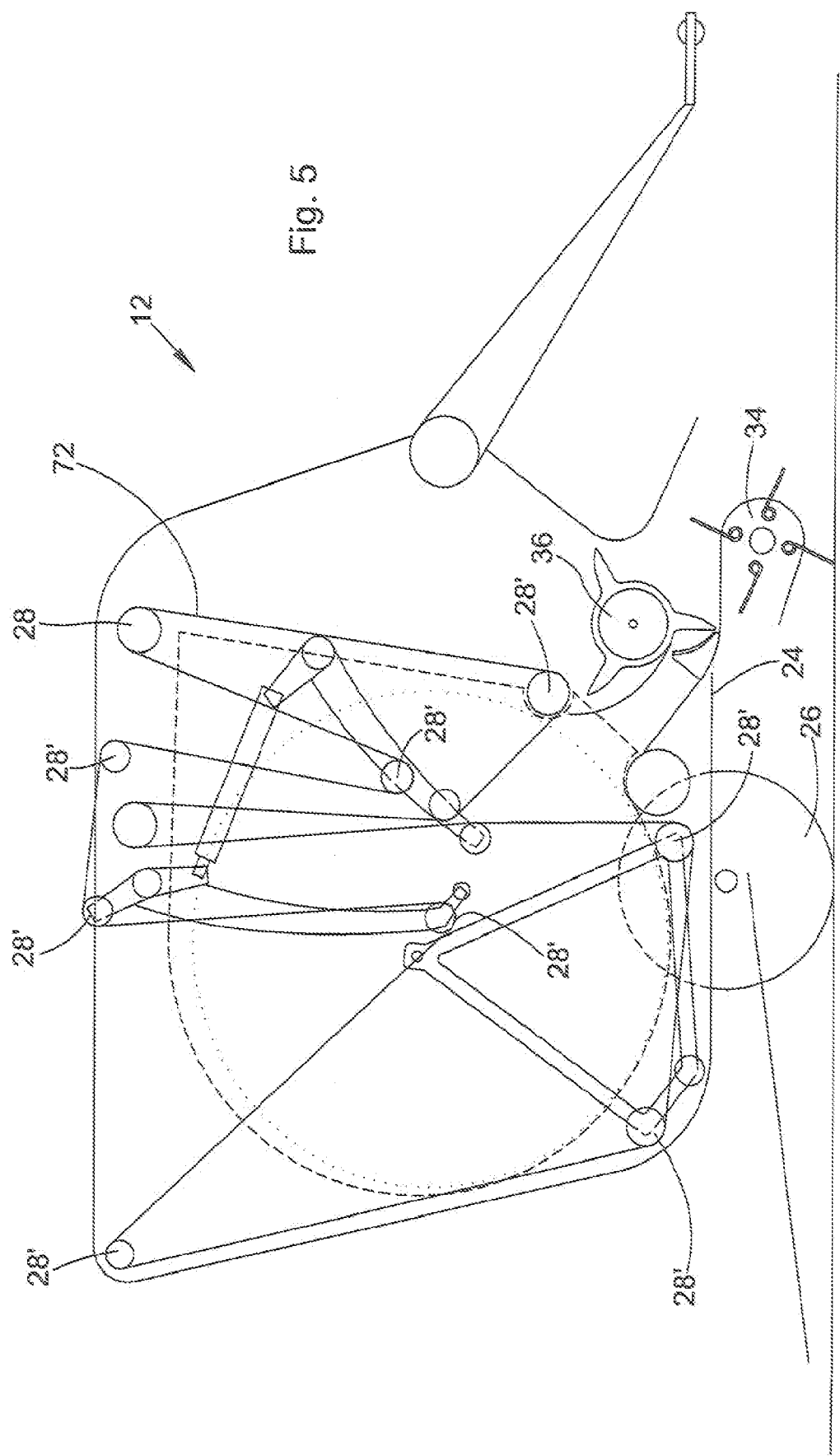

ROUND BALER WITH ELECTRICALLY DRIVEN ROLLER

FIELD OF THE INVENTION

The present invention relates to a round baler comprising a frame and a baling chamber radially surrounded by baling means with one or more driven rollers.

BACKGROUND OF THE INVENTION

A round baler is used in agriculture to collect or gather crop lying or standing on a field and to press and bind it into a bale. The baler is towed behind a tractor and comprises a frame on which a baling chamber, radially surrounded by bale forming means, is provided. The bale forming means consist of driven rafters, belts or chains with slats or a combination of two or more of those. Crop is collected from the ground fed into the baling chamber and baled there. Finally, a bale is wrapped with a twine or net or film and deposited on the ground when it has reached a desired size, density or mass.

The power for driving the bale forming means is, in the prior art, generally provided by the engine of the tractor that pulls the baler over the field. The engine drives a power take off (PTO) that drives a transmission of the baler via a universal joint shaft. The baler transmission on its end drives the rollers of the baling means or rollers driving the belts or chains of the baling means via associated drive trains.

It has been also proposed to drive a number of auxiliary components of a baler with electric motors, for example an arm of a binding mechanism (DE 28 01 309 A1) or a wrapping material dispenser (DE 41 32 664 A1). The energy source for the electric motors is provided on board the tractor. It has also been proposed to mount an electric generator on board the baler in order to drive an electric motor for the binding mechanism (EP 1 273 217 A1).

A self propelled rectangular baler with an electrically driven plunger is described in WO 94/24845 A2. Further, DE 10 2007 015 649 A1 describes a rectangular baler driven during a start-up phase with an electric motor, and DE 196 21 391 A1 and DE 196 28 604 A1 describe rectangular balers with a split drive having a first branch mechanically driven from the tractor and a second, electrically driven branch in order to maintain a desired drive speed.

Finally, EP 1 174 019 A1 describes a self propelled harvesting machine in the form of a combine or forage harvester. Crop feeding conveyors and processing elements like threshing drums or cutter heads are driven by electric motors that are mounted inside the rotationally driven element.

A disadvantage of the typical mechanical drive of the bale forming means is seen in the complexity, need for regular service, for example lubrication, and in the fixed rotation speed and direction. The electric motors driving auxiliary components of the balers do not drive the bale forming means, but only elements that just need a limited amount of power. Electric drives providing more power are only known in the context of rectangular balers and self propelled harvesting machines, but not for round balers.

Thus, it is an object of the invention to provide a round baler in which one or more of the aforementioned problems are overcome.

SUMMARY OF THE INVENTION

A round baler comprises a frame and a baling chamber. The latter is surrounded by bale forming means which consist of driven rollers (in particular if the baler is a fixed size baler) or comprises at least one driven roller (in particular if the baler is a variable size baler) which is partially surrounded by one or more belts or chains with slats. Of course, the baling chamber can be surrounded in part by driven rollers and in part by belts or chains driven by a roller. The mentioned driven roller or rollers are driven by an electric motor that is disposed inside the roller.

In this manner, a compact drive arrangement for the roller is obtained. A mechanical drive train between a transmission and the roller is not necessary anymore, avoiding cost, complexity, maintenance and the risk of failure of the drive train and reducing the risk of injury for the baler operator during maintenance or troubleshooting.

In a preferred embodiment, the motor comprises an output shaft which is connected to a radially extending supporting disk that is connected to a shell of the rotor. The motor can be connected to a first side wall of the baling chamber, while the roller is rotatably supported by suitable bearings on a second side wall of the baling chamber. At adjacent rollers, the location of the motors and the bearings can be respectively inverted. It would however also be possible to mount all motors on one side wall of the baling chamber and all bearings on the other side wall of the baling chamber. In another embodiment, the motor comprises a central, non-rotating part connected to both sidewalls, and a rotating part surrounding the central part. The rotating part is on its end connected to the shell of the rotor (see EP 1 174 019 A1).

Further, it is proposed to connect the electric motor or motors to an electronic control unit suited for controlling the speed of the motor. The electronic control unit can be connected to a sensor that senses the rotation speed of the motor for feedback and speed control purposes, or no such sensor is used and the electronic control unit just controls one or more of the voltage, current and/or frequency of the electric power submitted to the electric motor without a feedback sensor. The electronic control unit is preferably operable to control drive the motor with a variable speed and/or in both directions. The speed of the motor can for example depend on crop conditions, like moisture or the intake rate of crop. Also, the motor can be driven with a first speed and in a first direction during a baling operation and with a second speed (which is higher or lower than during baling) and for in a second direction during a wrapping operation. The different rotation directions of the roller and thus of the bale during baling and wrapping have the advantage that the risk of unwinding a wrapping material like twine during unloading the bale can be avoided, since the bale can roll out of the baler in the same direction as it rotates during wrapping. Further, the roller and the bale can be smoothly accelerated in a start phase after a bale has been ejected.

The present invention can be used in a self propelled round baler or in a round baler that is towed behind a tractor. The engine of the tractor drives a generator which powers the electric motor. The generator can be located on board the baler or the tractor. In the latter case, it is possible to dispense with a mechanical drive connection between the tractor and the baler, since the latter is driven entirely by electric motors and, if useful, by hydraulic actuators that are powered from the tractor hydraulics, for example for opening a rear door of the baler.

BRIEF DESCRIPTION OF THE DRAWINGS

The exemplary embodiments of the invention are described in detail below with reference to the accompanying drawings wherein:

FIG. 5 is a schematic lateral view of a second embodiment of a baler.

DESCRIPTION OF THE PREFERRED EMBODIMENT

Figure 1:
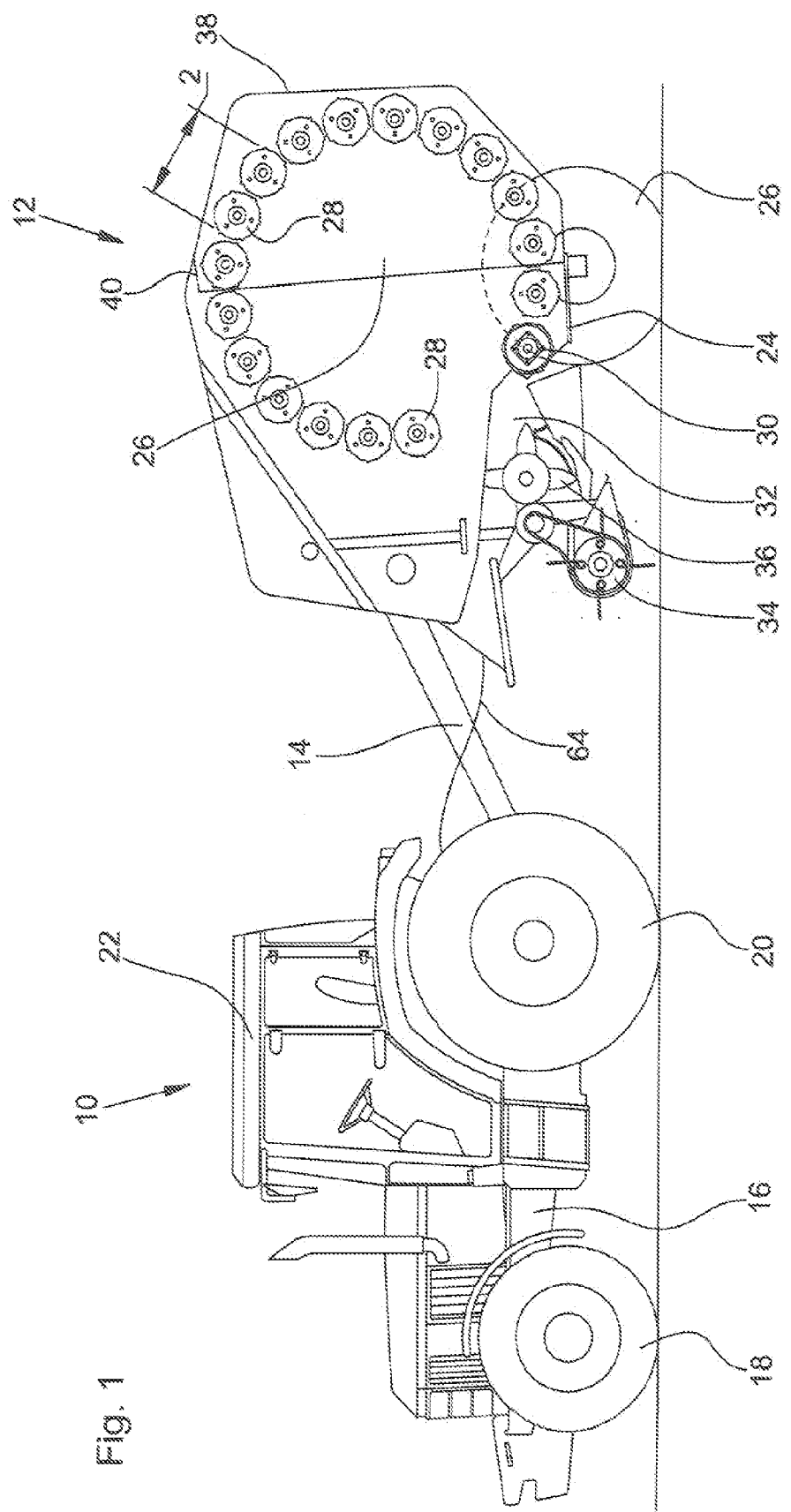
FIG. 1 is a lateral view of a baler towed behind a tractor.

FIG. 1 shows a lateral view of a tractor 10 and a round baler 12 coupled to a drawbar hitch of the tractor 10 by means of a drawbar 14. The tractor 10 is supported on a frame 16, which is in turn supported on steerable front wheels 18 and driven rear wheels 20, and supports a cab 22 with a workstation for an operator. In the following, direction indications such as front and rear, left and right, are given with respect to the normal forward direction of the tractor 10 that goes to the left in FIG. 1.

The round baler 12 comprises a frame 24 supported on wheels 26. The frame 24 supports a cylindrical baling chamber 26 surrounded by a number of (in this embodiment seventeen) rollers 28 and a feed-in roller 30 that surround the baling chamber 26 radially, leaving an infeed gap 32 for conveying crop into the baling chamber. The crop is lifted from the ground by a overshot pick-up 34 and fed by an undershot rotor 36 into the baling chamber 26 passing the infeed gap 32. The rear part of the round baler 12 comprises a rear door 38 that can be pivoted around an upper, transverse axis 40 to eject a bale from the baling chamber 26. The door 38 supports a number of the rollers 28 such that they move together when the door 38 opens, while the remaining rollers 28 are rigidly, but rotatably mounted within the frame 24.

Figure 2:
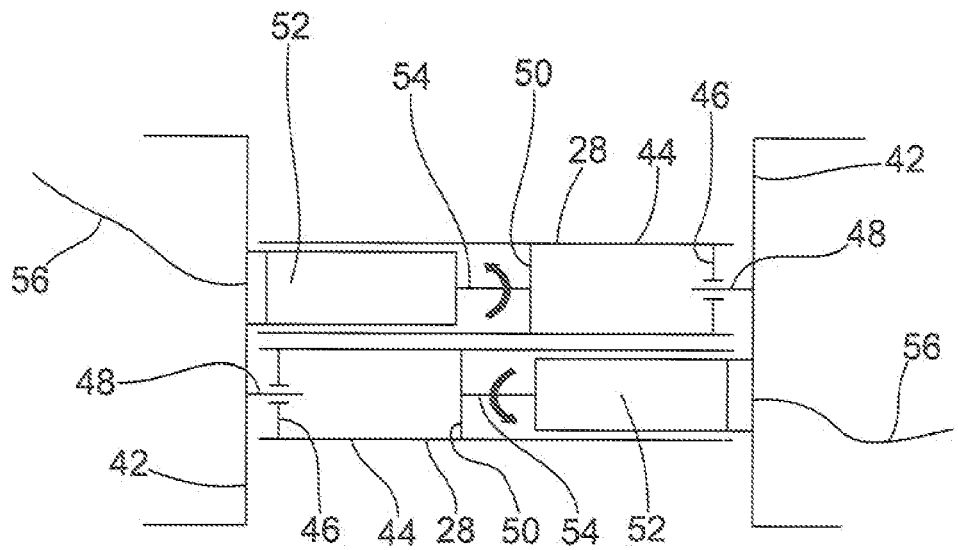
FIG. 2 is a section through the baler along line 2-2 in FIG. 1.

FIG. 2 illustrates a section through two rollers 28 and the side walls 42 of the door 38 supporting the rollers 28. The rollers 28 comprise a generally cylindrical shell 44 that can be provided with ridges or similar surface modifications (see FIG. 1) for increasing the crop feeding capabilities of the rollers 28. The shell 44 is supported on a first radially extending disk 46 close to a first end of the roller 28. The disk 46 is rotatably mounted by a bearing on a central axis 48 which is fixed on the side wall 42. The shell 44 is further supported on a second radially extending disk 50 that is located close to the centre of the shell 44. A housing of an electric motor 52 is mounted to another side wall 42, while an output shaft 54 of the motor 52 is connected to the disk 50 without any intermediate transmission. The output shaft 54 of the motor 52 can thus rotate the disk 50 and the shell 44 of the roller 28, which is supported with the bearing on the axis 48 and on the bearings of the rotor of the motor 52 in its housing. Adjacent rollers 28 are rotated by 180°, such that motors 52 of adjacent rollers 28 are mounted to different side walls 42. The rollers 28 that are not mounted to the door 38, but on the frame 24, are also mounted like shown in FIG. 2, however on side walls rigidly mounted to the frame 24. The same applies to the feed-in roller 30. Power is provided to the motors 52 by means of cables 56. Although not shown, seals can be provided between the shell 44 and the side walls 42 and/or between the disk 46 and the axis 48 and/or between the shell 44 (and/or the output shaft 54) and the housing of the motor 52 in order to increase the lifetime of the bearings and the motor 52. The feed-in roller 30 is mounted and driven in the same way as the rollers 28 shown in FIG. 2.

Although not shown, the rotor 36 and the pick-up 34 are also driven by electric motors 52 that can be mounted within the rotor 36 and pick-up 34 or outside of them, as shown for the pick-up 34 in FIG. 1.

Figure 3:
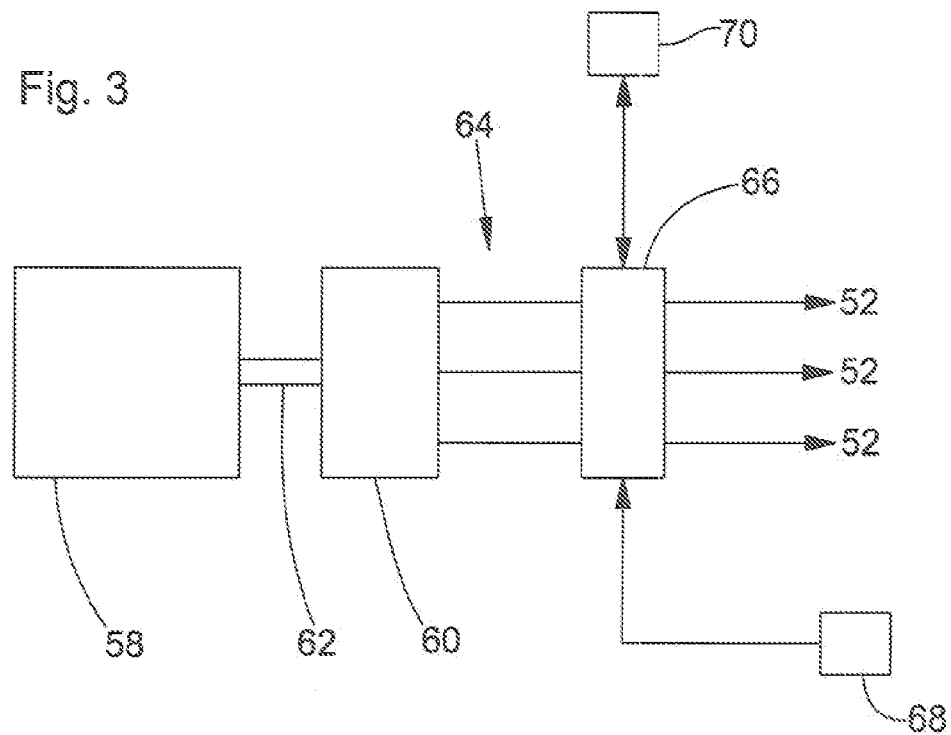
FIG. 3 is an electric circuit diagram of the drive circuit for the electric motors.

In FIG. 3, a schematic electric circuit diagram of the drive circuit for the electric motors 52 is shown. An engine 58 of the tractor 10 drives with its output shaft 62 an electric generator 60 that provides during operation of the engine 58 electric power at its output. In the embodiment shown, the generator produces 3 phase alternating current with a 400 V voltage, although the generator 60 could also output direct current or single phase alternating voltage with any suitable voltage. Engine 58 also drives the wheels 18, 20 of the tractor 10, via a mechanical drive connection (see e.g. EP 1 813 146 A2, the contents of which are incorporated herein by reference), although the wheels 18, 20 could be driven by hydraulic or electric motors. During the harvesting operation, the output speed of engine 58 and thus of generator 60 is preferably constant, although it could vary with the load of the engine or the propelling speed of the tractor 10. The output voltage of generator 60 is thus constant or variable.

The electric outputs of the generator 68 are connected by lines that are preferably contained in a single cable 64 to an electronic control unit 66 on board the baler 12. A suitable socket is provided at the rear of the tractor 10 into which a plug at the end of the cable 64 can be plugged (both plug and socket not shown). The electronic control unit 66 is on its end electrically connected to all the motors 52 including the motors 52 for the feed-in roller 30, the rotor 36 and the pick-up 34 by separate lines. To each motor 52, a speed sensor 68 is assigned. The speed sensors 68 are preferably included in the housings of the motors 52 and can comprise encoders or magnetic elements on the output shaft 54 and assigned feelers or any other type of speed sensors. The control unit 66 is capable of driving the motors 52 with a variable speed in a manner that the actual speed of the output shaft 54 corresponds to a nominal speed value. Further, the control unit 60 defines the rotation direction of the motors 52. The control unit 60 is connected to a baler controller 70 that defines the nominal speed value and the direction of the motors 52. The motors 62 can be of any suitable type, for example direct current motors or alternating current motors (one or three phases) of the synchronous or asynchronous type.

Figure 4:
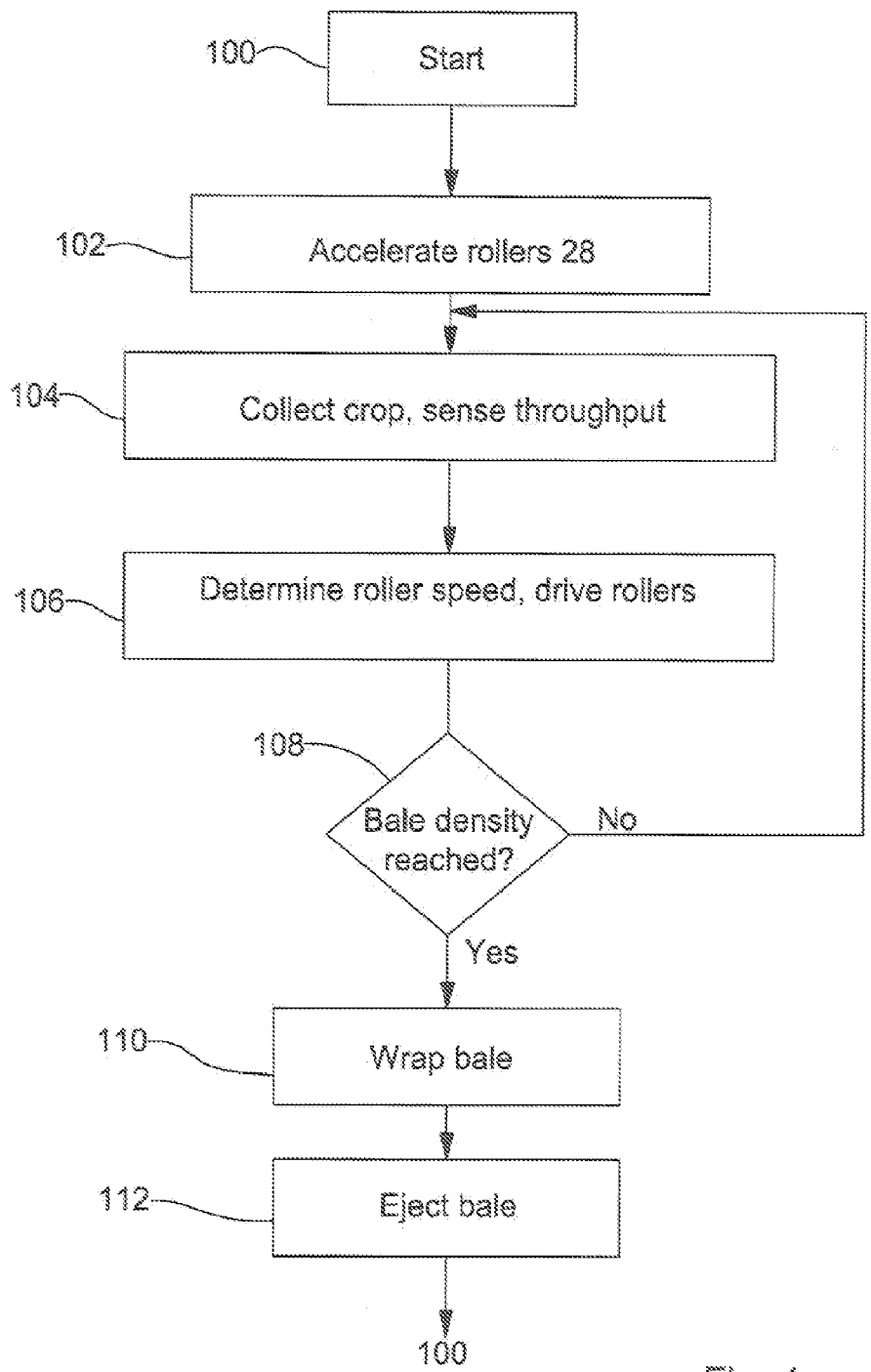
FIG. 4 is a flow diagram of the baler operation.

After all, the operation of the tractor 10 and baler 12 combination in the embodiment of FIGS. 1 to 3 is as shown in FIG. 4. After the start 100 of the baling operation, the rollers 28 are smoothly accelerated to a first speed. Baler controller 70 thus sends slowly increasing nominal speed values to the control unit 66, which controls the power to the motors 52 accordingly such that the feedback values from the sensors 68 correspond to the nominal values. All motors 52 are driven such that their shells 44 rotate at the same circumferential speed and, with respect to FIG. 1 clockwise (except the rotor 36). Then, crop is collected in step 104 and the throughput is sensed. This can be performed with usual sensors for the swath volume, using scanning ultrasonic or laser waves or a number of ultrasonic sensors distributed over the width of the swath, or by sensing the drive power of the motor 52 driving the pick-up 34 or the rotor 36. Further, the crop moisture can be measured with any suitable sensor. This throughput value and preferably the moisture are used to determine an optimal speed for the rollers 28, 30 by the baler control unit 70. This optimal speed is then sent to the control unit 66, which controls the power to the motors 52 accordingly such that the feedback values from the sensors 68 correspond to the nominal values. All motors 52 are driven such that their shells 44 rotate at the same circumferential speed. In this manner, energy can be saved at relatively low throughputs and/or dry crop material, while at high throughputs and/or wet crop material, the necessary rotation speed of the bale in the baling chamber 26 is maintained.

The pick-up 34 is preferably driven with a speed that is directly related to the forward speed of the tractor 10. For this purpose, the control unit 66 or the baler controller 70 can receive speed data via a bus link between a tractor controller and the baler controller 70 (not shown, see e.g. EP 1 813 146 A2, the contents of which are incorporated herein by reference). The rotor 36 is preferably driven with a circumferential speed that lies between the circumferential speed of the pickup 34 and the circumferential speed of the rollers 28 and 30.

In the following step 108, it is determined whether a desired bale density or weight has been reached. The bale density can be sensed with appropriate sensors (see e.g. U.S. Pat. No. 5,444,969 A) or and/or by integrating the values from the throughput measurement (step 104) and/or by weighing the baling chamber 26. If the desired bale density has not been reached, control goes back to step 104. Otherwise, step 110 is performed, in which the bale is wrapped with a twine, net or sheet as known in the art and thus not described in more detail. During this step 110, the rollers 28, 30 are driven inversely compared with step 106, such that they rotate counter clockwise with reference to FIG. 1. The bale thus rotates in the clockwise direction when it is wrapped. The speed of the rollers 28, 30 is preferably relatively high to accelerate the wrapping operation. Then, in step 112, the bale is ejected by opening the door 38 with a suitable actuator. This actuator can be a hydraulic cylinder powered by the on-board hydraulics of the tractor 10 or another electric motor. Further, the lower rollers 28 on which the bale is lying are also driven in the clockwise direction to unload the bale. Then, the door 38 is closed and step 100 follows again.

It is thus apparent that the electric drive motors 52 for the rollers 28, 30 allow dispensing with a mechanical drive connection between the tractor 10 and the baler 12 and a mechanical drive train within the baler 12. Further, they improve the operation of the baler 12, since their speed and direction can be easily and exactly controlled and altered dependent on the crop conditions and the actual step of the baling operation. If one motor 52 should fail, the baling operation can continue with a somewhat reduced performance.

A second embodiment of a baler 12 according to the invention is shown in a schematic side view in FIG. 5. This baler 12 is a variable size baler in which the baling chamber 26 is surrounded by a number of belts 72 arranged side by side (or a single belt) entrained around a number of rollers 28, 28'. One of the rollers 28 is driven by an electric motor 52 as shown in FIG. 2. The remaining parts of the baler 12 of FIG. 5 are described in EP 1 588 605 A1, the contents of which are incorporated herein by reference. The operation of the baler of FIG. 5 is analogous to the one of FIGS. 1 to 4.

Having described the preferred embodiment, it will become apparent that various modifications can be made without departing from the scope of the invention as defined in the accompanying claims.

The invention claimed is:

1. A round baler comprising:
   a frame; and
   a baling chamber with one or more driven rollers;
   wherein an electric motor for driving the one or more driven rollers is disposed in the interior of a first roller included in the one or more driven rollers; and
   wherein the motor comprises an output shaft coupled to a radially extending supporting disk directly connected to a shell of the first roller, whereby the motor may transmit rotational force to the first roller via the connection between the supporting disk and the shell of the first roller.

2. A round baler according to claim 1, wherein the baling chamber is one of entirely and partially surrounded by a plurality of rollers and an electric motor is disposed in the interior of and in driving connection with each roller included in the plurality of rollers.

3. A round baler according to claim 1, wherein the baler is a fixed size chamber baler.

4. A round baler according to claim 1, wherein the baling chamber is one of entirely and partially surrounded by one of belts and chains with slats that extend around the first roller, and an electric motor is disposed in the interior of and in driving connection with the first roller.

5. A round baler according to claim 1, wherein the baler is a variable size chamber baler.

6. A round baler comprising:
   a frame; and
   a baling chamber with one or more driven rollers;
   wherein an electric motor for driving the one or more driven rollers is disposed in the interior of a first roller included in the one or more driven rollers;
   wherein the motor comprises an output shaft coupled to a radially extending supporting disk connected to a shell of the first roller, whereby, in order to rotate the first roller, the motor transmits rotational force directly through the supporting disk to the first roller via the shell of the first roller; and
   wherein the motor is connected to a first side wall of the baling chamber with a rotationally fixed connection, the first roller is rotatably mounted on a second side wall of the baling chamber, and the motor is rotatably mounted to the second side wall indirectly via the first roller.

7. A round baler according to claim 6, wherein a second roller is provided adjacent the first roller, motor interior to the second roller being connected to the second side wall of the baling chamber with a rotationally fixed connection.

8. A round baler according to claim 1, wherein the motor is connected to an electronic control unit that is operable to control the motor speed with or without feedback.

9. A round baler according to claim 8, wherein the electronic control unit is operable to drive the motor at least one of with a variable speed and in different directions.

10. A round baler according to claim 9, wherein the electronic control unit is operable to drive the motor with a speed dependent on crop conditions including one of moisture and input rate.

11. A round baler according to claim 9, wherein the electronic control unit is operable to drive the motor during a wrapping operation at least one of with a higher speed and in a different direction than during a baling operation.

12. A round baler according to claim 9, wherein the electronic control unit is operable to accelerate the motor slowly in a start phase.

13. A combination of a round baler according to claim 1 and a tractor, wherein the electric motor is powered from a generator driven by an engine of the tractor, the generator being on board one of the tractor and the baler.

14. A combination according to claim 13, wherein no mechanical drive connection between the tractor and the baler is provided.

15. A round baler comprising:
   a frame; and
   a baling chamber with one or more driven rollers;

wherein an electric motor for driving the one or more driven rollers is disposed in the interior of a first roller included in the one or more driven rollers;

wherein the motor is connected to a first side wall of the baling chamber with a rotationally fixed connection; and wherein the first roller is rotatably mounted on a second side wall of the baling chamber, and the motor is rotatably mounted to the second side wall indirectly via the first roller.

16. A round baler according to claim 15, wherein the motor comprises an output shaft coupled to a radially extending supporting disk connected to a shell of the first roller, whereby, in order to rotate the first roller, the motor transmits rotational force directly through the supporting disk to the first roller via the shell of the first roller.

17. A round baler according to claim 15, wherein a second roller is provided adjacent the first roller, a motor interior to the second roller being connected to the second side wall of the baling chamber.

18. A round baler according to claim 15 wherein the motor is connected to an electronic control unit that is operable to control the motor with a speed dependent on crop conditions including one of moisture and input rate.

19. A round baler according to claim 15 wherein the motor is connected to an electronic control unit that is operable to drive the motor during a wrapping operation at least one of with a higher speed and in a different direction than during a baling operation.

* * * * *

UNITED STATES PATENT AND TRADEMARK OFFICE
CERTIFICATE OF CORRECTION

PATENT NO. : 8,807,023 B2  
APPLICATION NO. : 13/024480  
DATED : August 19, 2014  
INVENTOR(S) : Biziorek et al.

Page 1 of 1

It is certified that error appears in the above-identified patent and that said Letters Patent is hereby corrected as shown below:

In the Specification  
Col. 1, line 17, "rafters" should read --rollers--  
Col. 2, line 43, "and for in" should read --and/or--  
Col. 4, line 22, "68" should read --60--  
Col. 4, line 41, "62" should read --52--

Signed and Sealed this  
Twenty-fifth Day of November, 2014

Michelle K. Lee  
*Deputy Director of the United States Patent and Trademark Office*